(12) United States Patent
Mishra et al.

(10) Patent No.: US 11,409,621 B2
(45) Date of Patent: Aug. 9, 2022

(54) HIGH AVAILABILITY FOR A SHARED-MEMORY-BASED FIREWALL SERVICE VIRTUAL MACHINE

(71) Applicant: VMWARE, INC., Palo Alto, CA (US)

(72) Inventors: Rahul Mishra, Mountain View, CA (US); Sumedh Saurav, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 78 days.

(21) Appl. No.: 15/991,284

(22) Filed: May 29, 2018

(65) Prior Publication Data

US 2019/0370131 A1 Dec. 5, 2019

(51) Int. Cl.
*G06F 11/20* (2006.01)
*G06F 9/455* (2018.01)
*G06F 9/48* (2006.01)
*G06F 9/54* (2006.01)
*H04L 43/10* (2022.01)

(52) U.S. Cl.
CPC ........ *G06F 11/203* (2013.01); *G06F 9/45558* (2013.01); *G06F 9/4856* (2013.01); *G06F 9/544* (2013.01); *G06F 9/546* (2013.01); *H04L 43/10* (2013.01); *G06F 2009/4557* (2013.01)

(58) Field of Classification Search
CPC .. G06F 11/203; G06F 9/45558; G06F 9/4856; G06F 9/544; G06F 9/546; G06F 2009/4557; H04L 43/10
See application file for complete search history.

(56) References Cited

U.S. PATENT DOCUMENTS

| 8,863,124 | B1 * | 10/2014 | Aron | G06F 9/45533 |
| | | | | 709/223 |
| 2002/0059358 | A1 * | 5/2002 | Kanamori | G06F 9/4843 |
| | | | | 718/107 |
| 2011/0196968 | A1 * | 8/2011 | Kobayashi | G06F 11/3409 |
| | | | | 709/226 |
| 2016/0380848 | A1 * | 12/2016 | Raney | H04L 43/028 |
| | | | | 709/213 |

(Continued)

OTHER PUBLICATIONS

Sergey Sanduliak, "What's Split Brian and how to avoid it like the plague?", dated Jan. 3, 2018, 12 pages.

(Continued)

*Primary Examiner* — Kamini B Patel

(57) ABSTRACT

A method for a shared-memory-based SVM to provide high availability of service is disclosed. In an embodiment, an agent process of the SVM receives a signal that one or more data packets have been queued in a shared memory device of one or more shared memory devices. Upon receiving the signal, the agent process determines whether the SVM has been designated as active for the shared memory device, and if it has, the agent process reads the one or more data packets from the shared memory device. As the data packets are read from the shared memory device: for each data packet, of the one or more data packets read from the shared memory device: the agent process determines whether an indication that the packet is to be transmitted to its destination is received, and if the indication is received, the packet is placed back to the shared memory device.

20 Claims, 5 Drawing Sheets

(56) References Cited

U.S. PATENT DOCUMENTS

2017/0185445 A1 6/2017 Liu et al.
2018/0285232 A1* 10/2018 Minegishi ........... G06F 11/3433

OTHER PUBLICATIONS

PCT/US2019/034454, International Search Report dated Jul. 22, 2019. 15 pages.
Free CCNA Study Guides, 14-1 High Availability—VRRP, HSRP, GLBP dated Apr. 23, 2018, 12 pages.
VMware Docs, About High Availability dated May 25, 2017, 4 pages.
VMware Docs, Change High Availability Configuration dated Feb. 2, 2017, 3 pages. VMware Docs, NSX Edge dated Aug. 31, 2015, 5 pages.
R. White, Cisco Systems—High Availability in Routing—the Internet Protocol Journal—vol. 7, No. 1 dated Mar. 2004, 10 pages.

\* cited by examiner

HIGH AVAILABILITY FOR A SHARED-MEMORY-BASED FIREWALL SERVICE VIRTUAL MACHINE

BACKGROUND

In computer-based systems, high availability ("HA") refers to providing systems that are durable, likely to operate continuously, and available almost all the time. Typically, the HA systems have redundant hardware and software components that make the systems available even if some of the components fail. When a failure occurs, a failover process migrates the processing performed by a failed component to a backup component. The failover process makes sure that the backup component becomes active, recovers failed transactions, and restores operational functionalities of the system.

In computer-based virtualized environments, implementations of HA usually deal with a failure of a host. When a host fails, guest virtual machines ("guest VMs") executing on the host also fail. To recover from the failure, the HA mechanisms may be used to migrate the guest VMs from the failed host to another host and to restart the migrated guest VMs. This may include for example, modifying IP addresses of the migrated guest VMs.

Thus far, however, HA has not been available for shared-memory-based service VMs ("SVMs"), also referred to as virtual network appliances or virtual functions. Examples of the shared-memory-based SVMs include security or firewall services provided by vendors such as McAfee, Semantic, Norton, and others. Without the HA, if an SVM fails, redirection of some data packets from guest VMs may come to a halt and some data traffic may be dropped.

SUMMARY

Techniques are described herein for providing HA for a shared-memory-based SVMs. The shared-memory-based SVMs may include firewall or other network services implemented in SVMs executing on host computers of a datacenter. The presented techniques facilitate deployment of the HA on the SVMs that rely on shared memory for receiving data packets from guest VMs to perform network services on the packets.

One of the benefits of the presented approach is that a data packet queuing module of a hypervisor does not need to know about an active status of the SVM. In an embodiment, the network service is implemented not in one SVM, but in a pair of SVMs to provide redundancy. Both SVMs may be configured to provide network services to guest VMs. Examples of network services described herein include firewall services, but the same technique described herein for firewall services could be used for other network services, such as intrusion or malware detection, load balancing, bandwidth optimization, etc.

When a guest VM is being configured on a host, the configuration includes determining a network interface controller ("NIC") for the guest VM, and determining a security group for the guest VM. If the guest VM is configured as a member of a security group, then a binding between the guest VM and the security group is generated, stored, and communicated to a hypervisor kernel of a hypervisor, and then to a distributed virtual filter of the hypervisor. Based on the binding, the distributed virtual filter determines one or more shared memory spaces to which data packets communicated from the guest VM will be queued and from which SVMs will read the packets to apply security rules. A shared memory space is also referred to herein as a shared memory device, or a device.

Configuring a pair of SVMs is usually performed by a hypervisor and/or a central control plane, which itself may comprise a server or a server cluster that controls and manages the virtual switches, routers, etc., of the data plane via a management network. The configuration includes configuring each SVM of the pair with an agent process, and defining rules for designating the agent processes to the respective shared memory devices. The rules may take into account priorities assigned to the SVMs (or to the agent processes executing on the SVMs), and assign the shared memory devices to the agent processes based on the priorities. For example, if the hypervisor configured four shared memory devices, a first SVM ("SVM1") with a priority of "50," and a second SVM ("SVM2") with a priority of "20," then an agent process executing on the SVM1 may be designated as active for first three shared memory devices, and an agent process executing on the SVM2 may be designated as active for the fourth shared memory device. Other designations between the agents and devices are also possible, and they may take into account importance of the data traffics, loads on the devices, and the like.

Once guest VMs and a pair of SVMs are configured on a host, each SVM of the pair starts executing its own agent process. The agent processes executing on the SVMs are exclusively active for some shared memory devices, and exclusively standby for other shared memory devices, so that each shared memory device is associated with only one active agent process at a given time. Implementing the service in two SVMs assures that, at a given time, one of the two agent processes is active to handle data traffic generated by a guest VM.

In an embodiment, an agent process comprises a plurality of threads. The plurality of threads may include a main thread, a control thread, an HA path thread, and one or more threads for one or more shared memory devices configured by a hypervisor. For example, if there are four shared memory devices configured by the hypervisor, then an agent process may include a main thread, a control thread, an HA path thread and four threads for the shared memory devices. Additional threads may also be implemented.

In an embodiment, each of the shared memory devices is memory-mapped (mmapped) onto both SVMs. Furthermore, each of the SVMs may maintain its own state table to indicate for which shared memory devices an agent process of the SVM is active. For example, a state table maintained by an SVM1 may indicate that an agent process executing on the SVM1 is active for a device1 and a device2, but standby for a device3 and a device4, while a state table maintained by an SVM2 may indicate that an agent process executing on the SVM2 is active for the device3 and the device4, but standby for the device1 and the device2.

Once a guest VM starts generating data traffic, a distributed virtual filter identifies one or more shared memory devices designated to store data packets communicated from the guest VM, and queues the packets to that shared memory devices.

Usually, an SVM kernel module of an SVM is in a sleep mode. The threads of the agent process of the SVM may also be in a sleep mode. However, when a distributed virtual filter writes a data packet to a shared memory device, the distributed virtual filter calls a virtual machine communication interface (vmci) signaling to "wake" up the SVM kernel module. Upon waking up, the SVM kernel module makes a select call in the active user-space to determine whether the SVM's agent process is active for that shared memory device. If it is, then a thread (of the SVM's agent process) configured to handle data packets queued to that shared memory device is invoked. The thread accesses the shared memory device, and reads a data packet from the device. Then, the SVM inspects the packet, and performs its service operations. If the service is a firewall, for example, the SVM may determines whether the packet can be allowed and delivered to its destination. If it can, then the thread puts the packet back on a transmit ring of the device, and signals to the hypervisor to pick up the packet. However, if the packet cannot be allowed, then the packet is dropped. The thread keeps reading the data packets until all packets are drained from the corresponding shared memory device.

However, if the SVM's agent process is standby for that shared memory device, then the SVM reverts to a sleep mode, and the packets queued to that shared memory device are handled by an agent process executing on another SVM.

In an embodiment, two SVMs executing on a host communicate with each other via a heartbeat link. The SVMs may use the heartbeat link to for example, exchange with each other their own state tables, and to exchange messages such as keep-alive messages. If for some reason, an SVM1 fails, and an SVM2 will not receive keep-alive messages from the SVM1 via the heartbeat link for some time, then the SVM2 will start handling the data packets queued in all shared memory devices, including those devices that were previously handled by the SVM1.

In an embodiment, a hypervisor communicates with agent processes of the SVMs via control channels established between the hypervisor and the agent processes. The hypervisor may use the control channels to send a vmci signaling to the agent processes. For example, the hypervisor may use the control channels to test whether the SVMs are "alive" by monitoring receiving keep-alive messages from the SVMs via the control channels. If the hypervisor determines that it has not received keep-alive messages from an SVM1 for a certain period of time, then the hypervisor may determine that the SVM1 failed. Subsequently, the hypervisor may request that an agent process executing on an SVM2 needs to become active for all shared memory devices.

Such a request may be implemented in many ways. For example, a hypervisor may communicate, via a control channel to the SVMs, a count of the SVMs that the hypervisor determined as operational at a given time. If both SVMs are operational, then the hypervisor may determine the count of "2." However, if the hypervisor detects that an SVM1 failed to timely send its own keep-alive messages, then the hypervisor may determine that the SVM1 failed. Thus, the hypervisor may reduce the count from "2" to "1," and communicate the count of "1" to indicate that only one of the two SVMs is operational at this time. The hypervisor does not need to indicate which of the SVMs is operational because the count will be received only by the SVM that is still operational; the failed SVM will be unable to receive or process the count. Upon receiving the updated count, the active SVM will update its own state table for shared memory devices and will start handling data packets from all shared memory devices.

The above described request may be particularly useful in addressing a split-brain syndrome problem. A split-brain syndrome is a state in which a cluster of nodes gets divided into smaller clusters, and each of the smaller clusters believes that it is the only active cluster and that other clusters have failed. In the context of SVMs, a split-brain syndrome may occur when a heartbeat link between the SVMs failed. If the heartbeat link fails, then the SVMs are unable to receive keep-alive messages from another. Thus, each of the SVMs believes that it is the only active SVM, and mistakenly attempts to handle packets from all shared memory devices. However, because the keep-alive messages sent by the SVMs are also monitored by a hypervisor, the hypervisor may detect a failure of the SVM even if another SVM cannot. Upon detecting that for example, an SVM1 failed, the hypervisor reduces a count of operational SVMs from "2" to "1," and sends the updated count via control channels to both SVMs. The SVM that failed is unable to process the updated count as it is unable to handle any messages or data packets. But, the operational SVM will receive the updated count, determine that it is the only active SVM executing on a host, and start handling data packets from all shared memory devices until the designation to the shared memory devices changes.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. Example Physical Implementations

Figure 1:
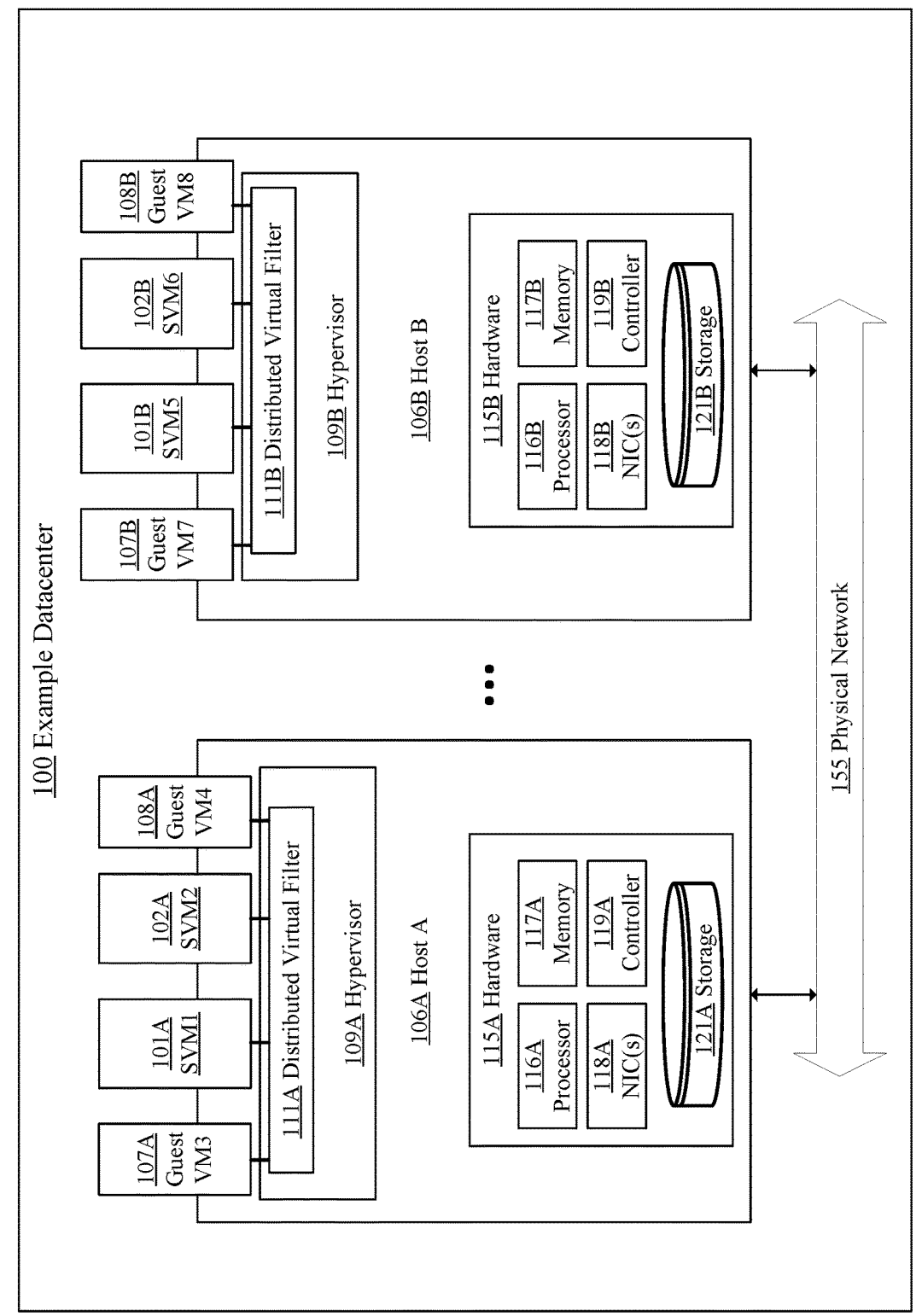
FIG. 1 is a block diagram depicting an example physical implementation view of an example logical network environment for implementing HA for a shared-memory-based firewall SVM.

FIG. 1 is a block diagram depicting an example physical implementation view of an example logical network environment 10 for implementing HA for a shared-memory-based firewall SVM. In the depicted example, environment 10 includes an example datacenter 100, which comprises one or more hosts 106A, 106B, and one or more physical networks 155.

Hosts 106A, 106B are used to implement logical routers, logical switches and VMs executing in datacenter 100. Hosts 106A, 106B are also referred to as computing devices, host computers, host devices, physical servers, server systems or physical machines. Each host may be configured to support several VMs. In the example depicted in FIG. 1, host 106A is configured to support an SVM1 101A, an SVM2 102A, a guest VM3 107A and a guest VM4 108A, while host 106B is configured to support an SVM5 101B, an SVM6 102B, a guest VM7 107B and a guest VM8 108B. Additional guest VMs may also be supported by hosts 106A-106B.

Virtual machines VM1-VM8 are executed on hosts 106A, 106B, respectively, and are examples of virtualized computing instances or workloads. A virtualized computing instance may represent an addressable data compute node or an isolated user space instance.

In the depicted example, SVM1 101A, SVM2 102A, SVM5 101B and SVM6 102B are shared-memory-based SVMs. Examples of the SVMs may include shared-memory-based firewall SVMs that execute firewall applications configured to monitor and control data traffic exchanged between guest VMs executing on the hosts.

Hosts 106A and 106B may also be configured to support execution of hypervisors 109A and 109B, respectively.

Hypervisors 109A and 109B are software layers or components that support the execution of multiple VMs, such as VM1-VM8. Hypervisors 109A and 109B may be configured to implement virtual switches and forwarding tables that facilitate data traffic between VM1-VM8. In certain embodiments, virtual switches and other hypervisor components may reside in a privileged virtual machine (sometimes referred to as a "Domain Zero" or "the root partition") (not shown). Hypervisors 109A and 109B may also maintain mappings between underlying hardware 115A, 115B, respectively, and virtual resources allocated to the respective VMs.

Hardware component 115A may include one or more processors 116A, one or more memory units 117A, one or more network interface controllers (NICs) 118A, one or more controllers 119A, and one or more storage devices 121A.

Hardware component 115B may include one or more processors 116B, one or more memory units 117B, one or more network interface controllers (NICs) 118B, one or more controllers 119B, and one or more storage devices 121B.

2. Example Shared-Memory-Based Services

Figure 2:
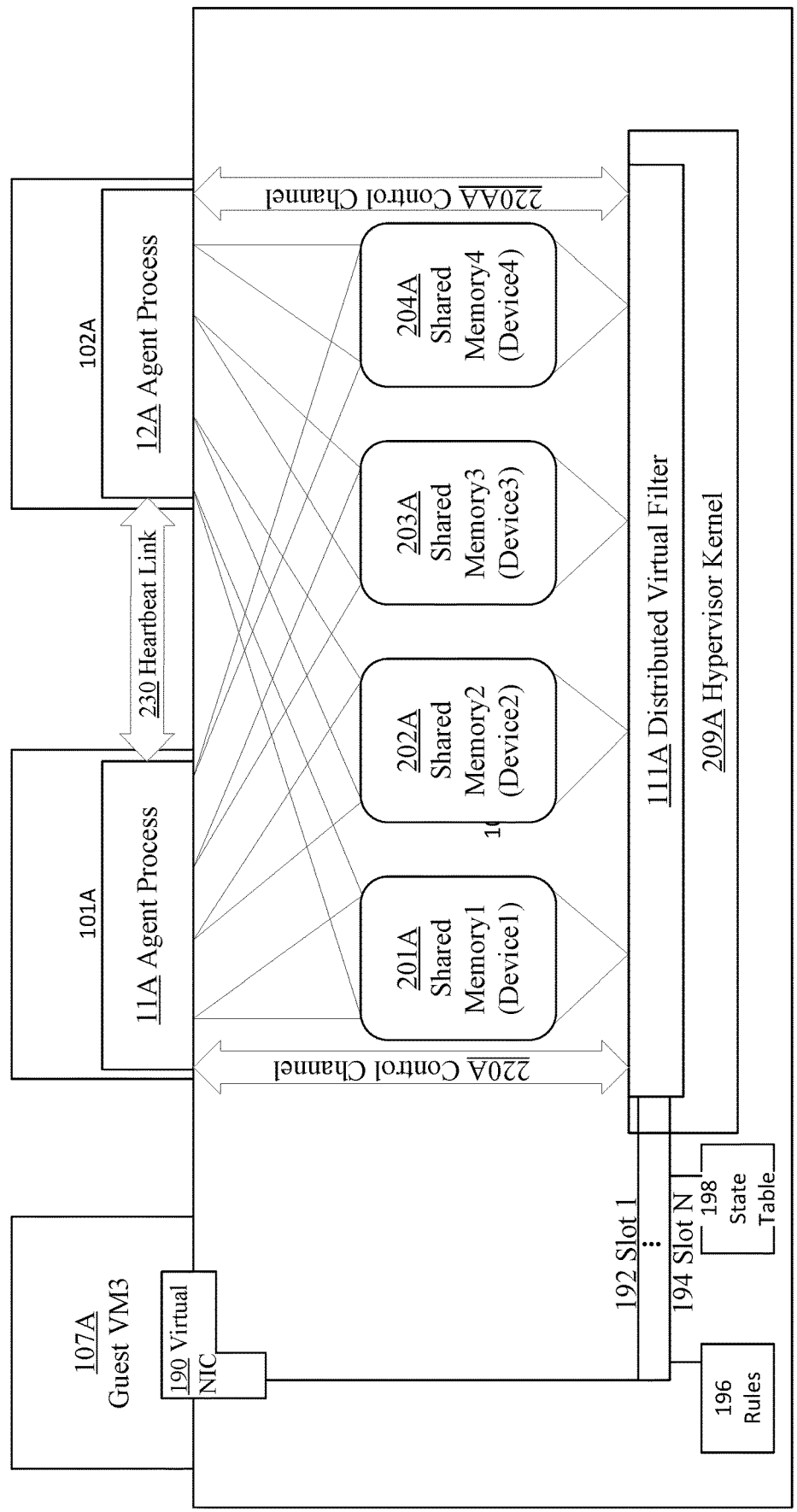
FIG. 2 is a block diagram depicting an example implementation of HA for a shared-memory-based firewall SVM.

FIG. 2 is a block diagram depicting an example implementation of HA for a shared-memory-based firewall SVM. In the depicted example, SVM1 101A and SVM2 102A implement a shared-memory-based service, such as a firewall-service or the like. The firewall service may be used to monitor and control data traffic exchanged between guest VM3 107A and guest VM4 108A, described in detail FIG. 1. Each of SVMs 101A-102A may execute an agent process 11A, 12A, respectively. Each agent process may execute a plurality of threads. An example agent process is described in FIG. 3.

In an embodiment, hypervisor 109A is includes a hypervisor kernel 209A. Hypervisor kernel 209A may be configured to manage processes implemented in hypervisor 109A, including a distributed virtual filter 111A.

Distributed virtual filter 111A may be configured to handle transmission rings, queue data packets to corresponding shared memory devices 201A-204A, and read, from shared memory devices 201A-204A, data packets processed by a firewall service. In the depicted example, the firewall service is implemented in both SVM1 101A and SVM2 102A, and is configured to apply firewall security rules to data packets queued to shared memory devices 201A-204A. In other examples, the firewall service may support additional devices.

In an embodiment, guest VM3 107A communicates with distributed virtual filter 111A via a virtual network interface controller (vNIC) 190, and via a slot 1 192, . . . , and a slot N 194. A typical count of slots is 4; however, depending on the implementation, the count of slots may be higher or lower.

In an embodiment, guest VM3 107A puts a data packet on vNIC 190 on an IOCHAIN, and distributed virtual filter 111A uses a registered callback to pick up the packet from the IACHAIN, and copy the packet to shared memory. Typically, guest VM3 107A does not have access to the shared memory.

A slot is a capture point in an IOCHAIN of vNIC 190. Stating differently, a slot is a filter point in a traffic path transmitted from guest VM3 107A to hypervisor 109A. SVM1 101A and SVM2 102A have access privilege through the vmci to shared memory in the hypervisor's kernel. Hence, when a data packet exits guest VM3 107A, guest VM3 107A puts the packet on the IOCHAIN of vNIC 190. An IOCHAIN filter is implemented in one or more slots to pick up the packet and put the packet into shared memory. The shared memory is then accessed by distributed virtual filter 111A of the hypervisor's kernel, and then by agent processes of SVM1 101A and SVM2 102A.

In an embodiment, data packets intercepted by vNIC 190 are directed to one of slots 192-194, and then, detected by distributed virtual filter 111A. Upon detecting a data packet, distributed virtual filter 111A determines, based on contents of a rule table 196 and a state table 198, whether the packet needs to be subjected to a processing, such as a firewall service available from SVM1 101A and SVM2 102A. If distributed virtual filter 111A determines that the packet needs to be processed, then distributed virtual filter 111A queues the packet to one of shared memory devices 201A-204A.

In an embodiment, each shared memory device configured in hypervisor 109A is memory-mapped (mmapped) onto both SVM1 101A and SVM2 102A. Therefore, both SVM1 101A and SVM2 102A can potentially read data packets from each of shared memory devices 201A-204A. However, at a given time, data packets queued to a particular shared memory device are read by either SVM1 101A or SVM2 102A, but not both. This depends on contents of state tables maintained by SVMs. For example, if a state table maintained by agent process 11A of SVM1 101A indicates that agent process 11A is active for shared memory device1 201A, then agent process 11A will read data packets queued in shared memory device1 201A. However, if the state table maintained by agent process 11A indicates that agent process 11A is standby for shared memory device1 201A, then agent 12A, not agent 11A, will read data packets queued in shared memory device1 201A. An example state table is described in FIG. 4.

In an embodiment, distributed virtual filter 111A is configured to communicate with SVM1 101A via a control channel 220A and with SVM2 102A via a control channel 220AA. Communications exchanged via control channels 220A-220AA may be exchanged in compliance with a vmci signaling. The communications may pertain to notifying agent processes 11A, 12A that data packets have been queued to any of shared memory devices 201A-204A. Distributed virtual filter 111A may also receive keep-alive messages from agent processes 11A-12A, and use the received keep-alive messages to determine whether the SVMs are operational. If distributed virtual filter 111A determines that for example, SVM1 101A failed, then distributed virtual filter 111A may update a variable called "number of active SVMs" from "2" to "1," and communicate the updated number of active SVMs to SVMs via control channels 220A-220AA. As described above, this mechanism will prevent occurrence of a split-brain syndrome problem in SVMs.

Control channels 220A-220AA may be also used to communicate rebalancing request to SVMs. For example, if it is determined that SVM1 101A, acting as active for device1 201A and device2 202A, carries too heavy load, then hypervisor 109A may modify the assignment between shared memory devices and SVM's agent processes. For instance, the assignment may be modified to make SVM1 101A active for device1 201A and to make SVM2 102A active for device2 202A. The modifications may be communicated as a rebalancing request to the SVMs. Upon receiving the rebalancing request, the SVMs may update their own state tables accordingly.

In an embodiment, SVM1 101A and SVM2 102A are configured to communicate with each other via a heartbeat link 230. Heartbeat link 230 may be configured as an out-of-band interface managed by HA slow-path threads of agent processes 11A-12A, as described in FIG. 3. SVM1 101A and SVM2 102A may be configured to exchange communications via heartbeat link 230 in compliance with an HA protocol, or the like.

Heartbeat link 230 may be used to communicate keep-alive messages between SVMs. If for example, SVM1 101A does not receive keep-alive messages from SVM2 102A during a certain time period, then SVM1 101A may determine that SVM2 102A failed, and therefore, SVM1 101A may become active for all shared memory devices including those that were previously handled by SVM2 102A.

Heartbeat link 230 may be also used to communicate, from one SVM to another SVM, device identifiers of the shared memory devices for which the SVM is active. For example, if SVM1 101A is configured as active for device1 201A and device2 202A, then SVM1 101A may communicate, via heartbeat link 230 to SVM2 102A, an update indicating that SVM1 101A is active for device1 201A and device2 202A. Upon receiving the update, an agent process of SVM2 102A may update its own state table to indicate that SVM2 102A is standby for device1 201A and device2 202A, and that SVM2 102A is active for device3 203A and device4 204A.

Furthermore, if SVM2 102A is configured as active for device3 203A and device4 204A, then SVM2 102A may communicate, via heartbeat link 230 to SVM1 101A, that SVM2 102A is active for device3 203A and device4 204A. Upon receiving the update, an agent process of SVM1 101A may update its own state table to indicate that SVM1 101A is active for device1 201A and device2 202A, and that SVM1 101A is standby for device3 203A and device4 204A.

3. Example Agent Process

Figure 3:
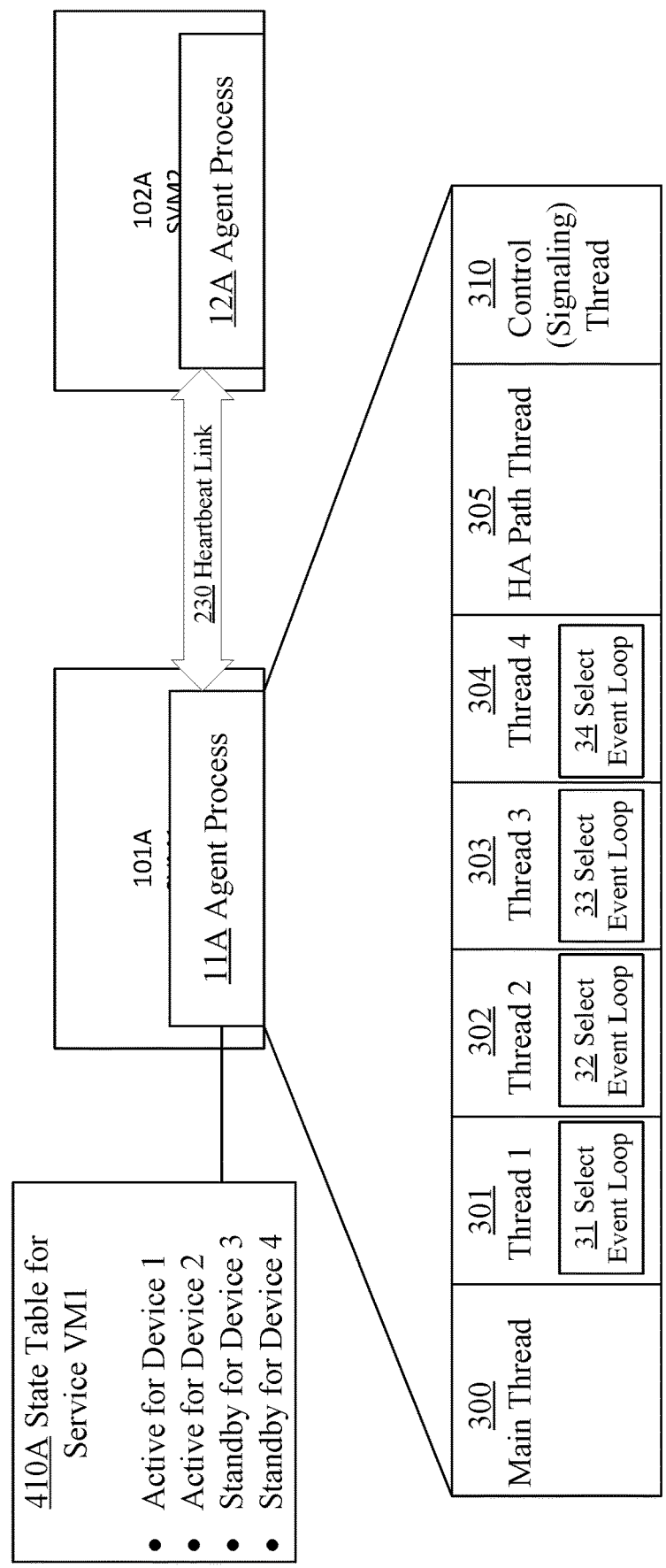
FIG. 3 is a block diagram depicting an example agent process implemented in a shared-memory-based firewall SVM.

FIG. 3 is a block diagram depicting an example agent process implemented in a shared-memory-based firewall SVM. In an embodiment, agent process 11A comprises a main thread 300, a HA path thread 305, a control (signaling) thread 310, and as many threads 301, 302, 303, 304, etc., as needed to handle shared memory devices configured in a hypervisor.

In an embodiment, main thread 300 is configured to manage other threads 301-310. For example, main thread 300 may receive, from control thread 310, an indication that data packets have been queued to a particular shared memory device. Upon receiving the indication, main thread 300 may determine whether agent process 11A has been designated as active for the particular shared memory device, and if so, main thread 300 may invoke a corresponding thread to read the data packets from the shared memory device. For example, if the particular shared memory device is device1 201A, and agent process 11A has been designated as active for device1 201A, then main thread 300 "wakes" up thread1 301 to cause thread1 301 to start executing a select event loop 31 to read the data packets from device1 201A. According to other examples, main thread 300 may wake up thread2 302, thread3 303, or thread4 304 to start execution of corresponding select event loops 32, 33, or 34 to read packets from shared memory devices 202A, 203A, or 204A, respectively.

In an embodiment, control (signaling) thread 310 is configured to receive a vmci signaling from distributed virtual filter 111A. For example, main thread 300 may receive indications that data packets have been queued to shared memory devices, and/or may send a request to distributed virtual filter 111A to pick up data packets from the shared memory devices.

Furthermore, control (signaling) thread 310 may be configured to receive, from distributed virtual filter 111A, a signal indicating a number of active SVMs, as described above. Moreover, control thread 310 may receive updates for a state table 410A from distributed virtual filter 111A, and update state table 410A according to the received updates.

In an embodiment, HA path thread 305 is configured to synchronize states between SVM1 101A and SVM2 102A. For example, HA path thread 305 may be configured to detect keep-alive messages received from SVM2 102A, and use the information about the detected keep-alive messages to determine whether SVM2 102A is operational. For instance, HA path thread 305 may monitor heartbeat link 230 established between SVM1 101A and SVM1 102A, and detect whether keep-alive messages are received from agent process 12A implemented in SVM2 102A. If HA path thread 305 does not receive any keep-alive message from agent process 12A during a certain time period, then HA path thread 305 may determine that SVM2 102A has failed. Subsequently, HA path thread 305 may notify control thread 310 that SVM2 102A has failed, and control thread 310 may cause updating state table 410 for SVM1 101A to indicate that SVM1 101A is now active for all shared memory devices configured on the host.

4. Example State Tables

Figure 4:
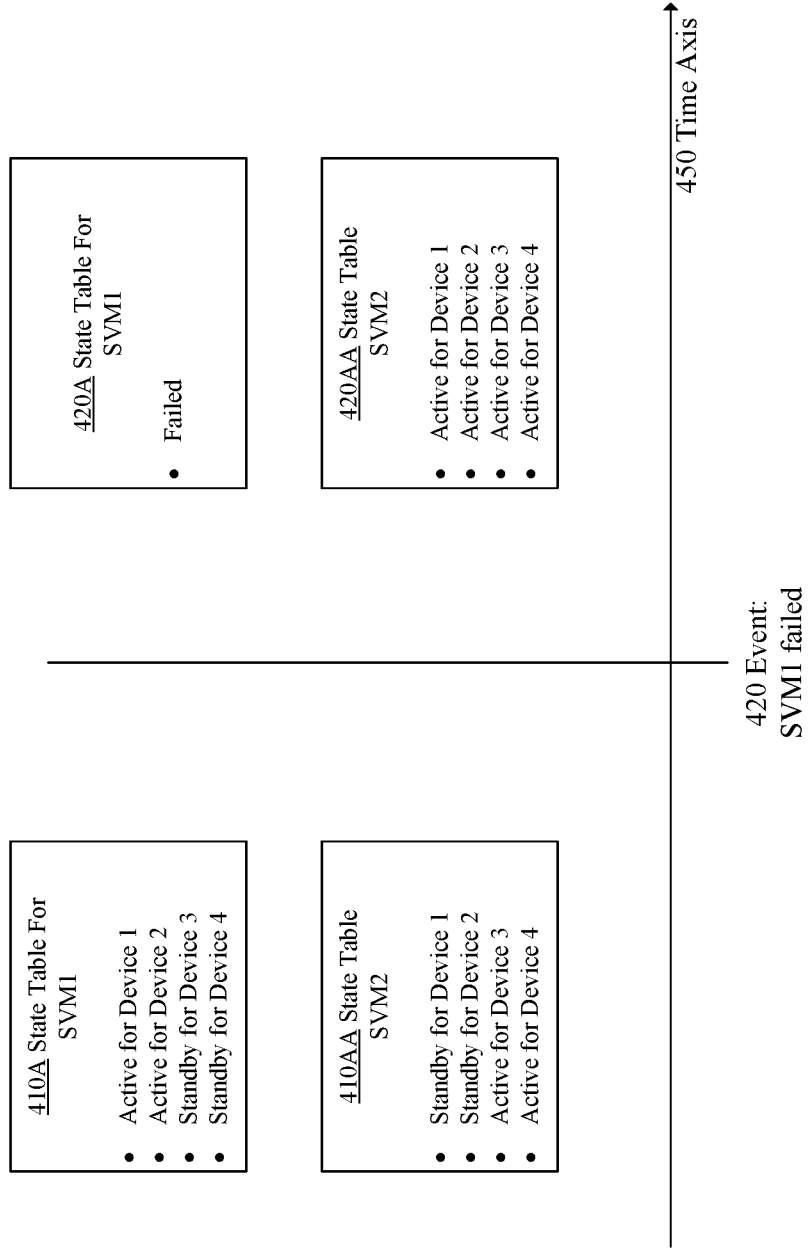
FIG. 4 is a block diagram depicting examples of state tables maintained by shared-memory-based firewall SVMs.

FIG. 4 is a block diagram depicting examples of state tables maintained by shared-memory-based firewall SVMs. Depicted state tables are provided to merely describe clear examples, and should not be considered as limited in any way.

Contents of a state table may be determined by distributed virtual filter 111A and/or according to priorities assigned to SVM1 101A and SVM2 102A by a hypervisor or a software defined networking manager. The assignment of the priorities depends on the implementation. In an embodiment, SVM1 101A may be assigned a high priority such as "50," and SVM2 102A may be assigned a low priority such as "20." Therefore, the distributed filter 111A may assign for example, agent process 11A as active for shared memory device1 201A and shared memory device2 202A, and assign agent process 12A as active for shared memory device3 203A and shared memory device4 204A. The assignments may be communicated to agent processes 11A-12A, and the agent processes may store the assignments in their own state tables.

As depicted in FIG. 4, prior to occurrence of event 420, state table 410A, maintained by the SVM1, stores information indicating that an agent process configured on the SVM1 is active for a device1 and a device2, and that is standby for a device3 and a device4. Furthermore, prior to occurrence of event 420, state table 410AA, maintained by the SVM2, stores information indicating that an agent process configured on the SVM2 is active for the device3 and the device4, and that is standby for the device1 and the device2.

However, after detecting occurrence of event 420, which pertains to failure of the SVM1, the contents of state tables 410A, 410AA are updated to resulting state tables 420A, 420AA, respectively. Therefore, after occurrence of event 420, state table 420A is most likely destroyed, and state table 420AA stores information indicating that the agent process configured on the SVM2 is active for all devices, including the device1, device2, device3 and device4.

5. Example Workflow

Figure 5:
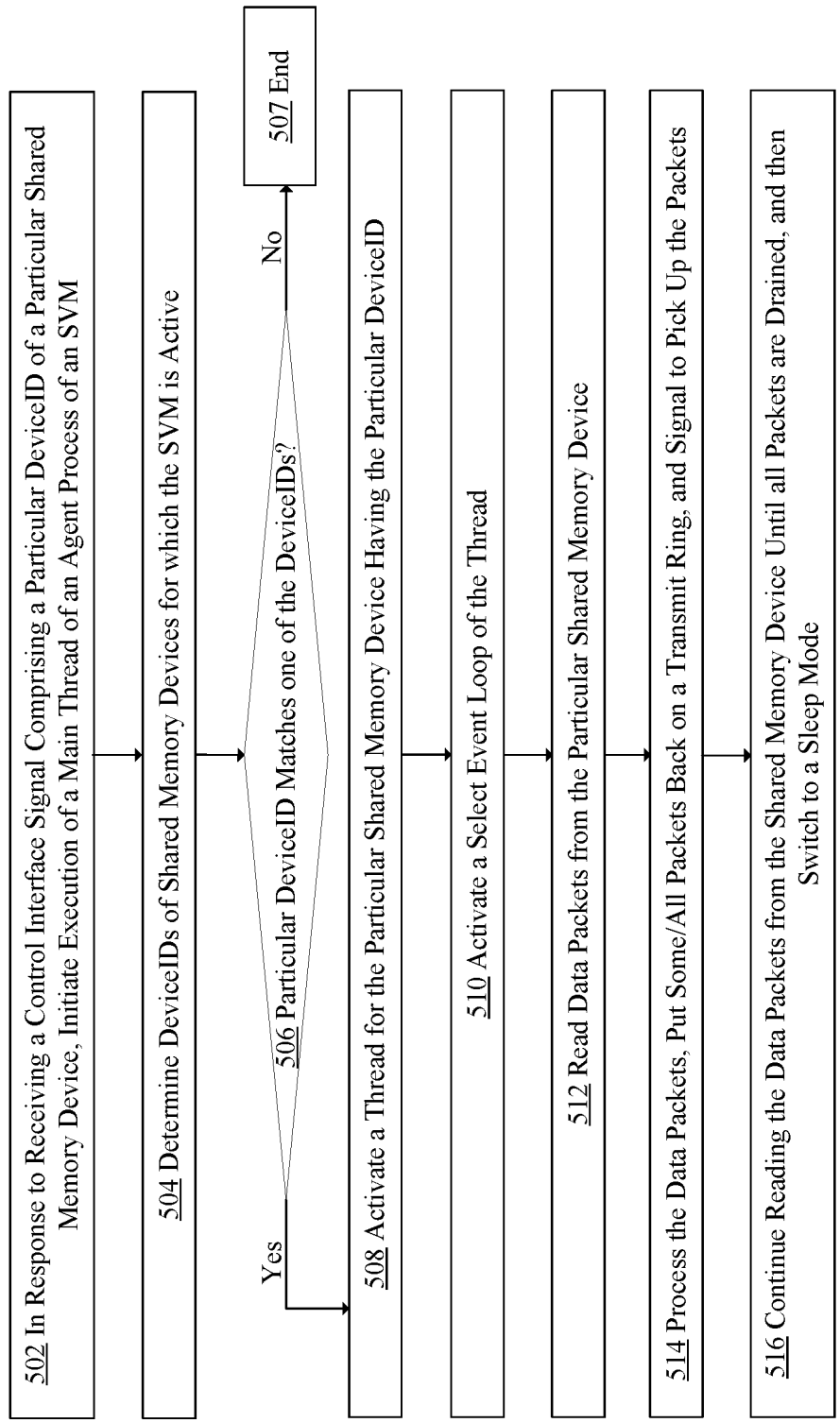
FIG. 5 is an example flow chart for implementing HA for a shared-memory-based firewall SVM.

FIG. 5 is an example flow chart for implementing HA for a shared-memory-based firewall SVM. In step 502, an agent process of an SVM instantiated on a host receives a control interface signal indicating that one or more data packets have been queued in a particular shared memory device. The control signal may include a particular shared memory device identifier, such as a particular deviceID, that identifies the particular shared memory device. Upon receiving the control interface signal, the agent process initiates execution of for example, a main thread of the agent process.

In step 504, the agent process (or the main thread) determines for which shared memory devices configured on the host the SVM is active. To make that determination, the main thread may access a state table maintained by the agent process, and extract those device identifiers that correspond to the shared memory devices for which the SVM is active. For example, if the state table maintained by the agent process corresponds to state table 410A depicted in FIG. 4, then the main thread may determine that the SVM is active for a shared memory device1 and a shared memory device 2. Furthermore, the main thread may determine a device1ID and a device2ID that correspond to the device1 and the device2, respectively.

In step 506, the agent process (or the main thread) tests whether the particular deviceID matches the device1ID or the device2ID. If the match is found, then step 508 is performed. Otherwise, step 507 is performed, in which the agent process and the SVM switch to a sleep mode, and remain in that mode until a new control interface signal is received.

Suppose that the particular deviceID matches the device1ID, and the device1ID is an identifier of the particular shared memory device.

In step 508, the agent process (or the main thread) activates a thread1 that corresponds to the particular shared memory device.

In step 510, the thread1 activates a select event loop for the particular shared memory device.

In step 512, the select event loop reads data packets from the particular shared memory device.

In step 514, the read data packets are processed by the SVM by applying firewall rules to the read packets to determine whether the data packets can be transmitted toward their respective destinations. If some, or all, the data packets can be transmitted toward their respective destinations, then those data packets are put back on a transmit ring in the particular shared memory device. Also in this step, the agent process (or a control signaling thread) may signal to the hypervisor to pick up the data packets from the particular shared memory device.

In step 516, the select event loop continues reading data packets from the particular shared memory device until all packets are drained. Once all packets are read from the particular shared memory device, the select event loop is deactivated, and the SVM switches to a sleep mode.

The process may be repeated each time the agent process of the SVM receives a control interface signal indicating that one or more data packets have been queued in one of the shared memory devices. Upon receiving the control interface signal, the agent process wakes up, and executes steps 502-514.

6. Improvements Provided by Certain Embodiments

In an embodiment, an approach provides mechanisms for implementing HA for shared-memory-based service SVMs. The presented mechanisms allow implementing the HA for service VMs that access data packets stored in shared memory of a hypervisor.

In an embodiment, the presented approach improves shared-memory-based firewall services by providing HA for SVMs implementing the firewall processes.

One of the benefits of the presented approach is that a data packet queuing module of a hypervisor does not need to know about an active status of the SVMs because the SVMs implement a pair of SVMs (an active SVM and a standby SVM) to provide redundancy. Implementing the service in two SVMs assures that at a given time, at least of the SVMs remains active to handle data traffic generated by guest VMs.

7. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus, and used for storing information and software instructions to be executed by a processor. Main memory may also be used for storing temporary variables or other intermediate information during execution of software instructions to be executed by one or more processors.

8. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method for shared-memory-based service virtual machines (SVMs) to provide high availability of service, the SVMs comprising a first SVM and a second SVM for a plurality of shared memory devices, each of the plurality of shared memory devices being shared with both the first SVM and the second SVM, the first SVM being a standby SVM for at least one of the plurality of shared memory devices and an active SVM for at least one other of the plurality of shared memory devices, the method comprising:
receiving, by a first agent process of the first SVM, a signal that one or more data packets have been queued in a first shared memory device of the plurality of shared memory devices;
in response to receiving the signal, determining, by the first agent process, whether the first SVM has been designated as the active SVM or the standby SVM for the first shared memory device;
in response to determining that the first SVM has been designated as the standby SVM for the first shared memory device, reading, by a second agent process of the second SVM, the one or more data packets from the first shared memory device; and
wherein reading the one or more data packets from the first shared memory device comprises, for each data packet of the one or more data packets read from the first shared memory device:
determining whether an indication that the data packet is to be further transmitted is received; and
if the indication is received, placing the data packet back to the shared memory device.

2. The method of claim 1, further comprising:
invoking a control thread of the second agent process to monitor keep-alive messages exchanged by the second SVM and the first SVM via a heartbeat link established between the second SVM and the first SVM;
wherein upon detecting a first keep-alive message sent by the second SVM, the control thread determines that the second SVM remains operational; and
wherein upon not receiving a second keep-alive message from the second SVM during a certain time period, the control thread determines that the second SVM became nonoperational; and
based at least on the second SVM being nonoperational, designating the first SVM as the active SVM for each of the plurality of shared memory devices.

3. The method of claim 2, further comprising: in response to not receiving the second keep-alive message from the second SVM during the certain time period, the control thread updates designations of the one or more shared memory devices for which the second SVM is active.

4. The method of claim 2, further comprising:
based at least on the second SVM being nonoperational, updating a state table of the first SVM to indicate that the first SVM is active for each of the plurality of shared memory devices.

5. The method of claim 1, further comprising:
receiving, at the second agent process of the second SVM, from a distributed virtual filter, a count of active service virtual machines (SVMs);
determining whether the count of active SVMs is greater than one;
in response to determining that the count of active SVMs is greater than one, determining that both the second SVM and another SVM remain operational; and
in response to determining that the count of active SVMs is not greater than one, determining that the second SVM remains operational and the first SVM has failed, and updating a state table maintained by the second SVM to indicate that the second SVM is active for each of the plurality of shared memory devices.

6. The method of claim 1, further comprising:
receiving, at the first agent process of the first SVM, an update for a first state table maintained by the first SVM;
wherein the update for the first state table includes one or more device identifiers, corresponding to one or more of the plurality of shared memory devices for which the first SVM is active; and
based on the update for the first state table, updating a second state table maintained by the second SVM to indicate the one or more of the plurality of shared memory devices for which the first SVM is active.

7. The method of claim 1, wherein the standby SVM is in a sleep mode.

8. One or more non-transitory computer-readable storage media storing one or more computer instructions which, when executed by one or more processors, cause the one or more processors to provide high availability for a shared-memory-based service virtual machines (SVMs), the SVMs comprising a first SVM and a second SVM for a plurality of shared memory devices, each of the plurality of shared memory devices being shared with both the first SVM and the second SVM, the first SVM being a standby SVM for at least one of the plurality of shared memory devices and an active SVM for at least one other of the plurality of shared memory devices, and to perform:
   receiving, by a first agent process of the first SVM, a signal that one or more data packets have been queued in a first shared memory device of the plurality of shared memory devices;
   in response to receiving the signal, determining, by the first agent process, whether the first SVM has been designated as the active SVM or the standby SVM for the first shared memory device;
   in response to determining that the first SVM has been designated as the standby SVM for the first shared memory device, reading, by a second agent process of the second SVM the one or more data packets from the first shared memory device; and
   wherein reading the one or more data packets from the shared memory device comprises, for each data packet of the one or more data packets read from the shared memory device:
      determining whether an indication that the data packet is to be further transmitted is received; and
      if the indication is received, placing the data packet back to the shared memory device.

9. The one or more non-transitory computer-readable storage media of claim 8, comprising additional instructions which, when executed by the one or more processors, cause the one or more processors to perform:
   invoking a control thread of the second agent process to monitor keep-alive messages exchanged by the active SVM and the standby SVM via a heartbeat link established between the active SVM and the standby SVM;
   wherein upon detecting a first keep-alive message sent by the second SVM, the control thread determines that the second SVM remains operational; and
   wherein upon not receiving a second keep-alive message sent by the second SVM during a certain time period, the control thread determines that the second SVM became nonoperational; and
   based at least on the second SVM being nonoperational, designating the first SVM as the active SVM for each of the plurality of shared memory devices.

10. The one or more non-transitory computer-readable storage media of claim 9, comprising additional instructions which, when executed by the one or more processors, cause the one or more processors to perform: in response to not receiving the second keep-alive message from the second SVM during the certain time period, the control thread updates designations of the one or more shared memory devices for which the second SVM is active.

11. The one or more non-transitory computer-readable storage media of claim 8, comprising additional instructions which, when executed by the one or more processors, cause the one or more processors to perform:
   based at least on the second SVM being nonoperational, updating a state table of the first SVM to indicate that the first SVM is active for each of the plurality shared memory devices.

12. The one or more non-transitory computer-readable storage media of claim 9, comprising additional instructions which, when executed by the one or more processors, cause the one or more processors to perform:
   receiving, at the second agent process of the SVM, from a distributed virtual filter, a count of active SVMs;
   determining whether the count of active SVMs is greater than one;
   in response to determining that the count of active SVMs is greater than one, determining that both the second SVM and another SVM remain operational; and
   in response to determining that the count of active SVMs is not greater than one, determining that the second SVM remains operational and the first SVM has failed, and updating a state table maintained by the second SVM to indicate that the second SVM is active for each of the plurality of shared memory devices.

13. The one or more non-transitory computer-readable storage media of claim 8, comprising additional instructions which, when executed by the one or more processors, cause the one or more processors to perform:
   receiving, at the second agent process of the second SVM, an update for a second state table maintained by the second SVM;
   wherein the update for the second state table includes one or more device identifiers, corresponding to one or more of the plurality of shared memory devices for which the second SVM is active and to one or more of the plurality of shared memory devices for which the second SVM is on standby; and
   based on the update for the second state table, updating a first state table maintained by the first SVM to indicate the one or more of the plurality of shared memory devices for which the second SVM second is active and the one or more of the plurality of shared memory devices for which the second SVM is on standby.

14. The one or more non-transitory computer-readable storage media of claim 8, wherein the agent process of the second SVM comprises a plurality of threads; and
   wherein the plurality of threads includes one or more of: a main thread, a high availability thread, a control thread, and one or more shared memory threads.

15. A shared-memory-based service virtual machine (SVM) implemented in a host computer, the shared-memory-based SVM being configured to provide high availability of service, the shared-memory-based SVM comprising:
   one or more processors;
   one or more memory units; and
   one or more non-transitory computer-readable storage media storing one or more computer instructions which, when executed by the one or more processors, cause the one or more processors to perform:
      receiving, by an agent process of the shared-memory-based SVM, a signal that one or more data packets have been queued in a first shared memory device of a plurality of shared memory devices, each of the plurality of shared memory devices being shared with the shared-memory-based SVM and a second shared-memory-based SVM, the shared-memory-based SVM being a standby SVM for at least one of the plurality of shared memory devices and an active SVM for at least one other of the plurality of shared memory devices;

in response to receiving the signal, determining, by the agent process, whether the shared-memory-based SVM has been designated as the active SVM or the standby SVM for the first shared memory device;

in response to determining that the shared-memory-based SVM has been designated as the standby SVM for the first shared memory device, enabling a second agent process of the second shared-memory-based SVM to read the one or more data packets from the first shared memory device; and wherein reading the one or more data packets from the first shared memory device comprises, for each data packet of the one or more data packets read from the shared memory device:

determining whether an indication that the data packet is to be further transmitted is received; and if the indication is received, placing the data packet back to the shared memory device.

16. The shared-memory-based SVM of claim 15, storing additional instructions which, when executed by the one or more processes, cause the one or more processors to perform:

invoking a control thread of the agent process to monitor keep-alive messages exchanged by the second shared-memory-based SVM and the shared-memory based SVM via a heartbeat link established between the second shared-memory based SVM and the shared-memory based SVM;

wherein upon detecting a first keep-alive message sent by the second shared-memory based SVM, the control thread determines that the second shared-memory based SVM remains operational;

wherein upon not receiving a second keep-alive message sent by the second shared-memory based SVM during a certain time period, the control thread determines that the second shared-memory based SVM became nonoperational; and based at least on the second shared-memory based SVM being nonoperational, designating the shared-memory based SVM as the active SVM for each of the plurality of shared memory devices.

17. The shared-memory-based SVM of claim 16, storing additional instructions which, when executed by the one or more processes, cause the one or more processors to perform: in response to not receiving the second keep-alive message from the second shared-memory based SVM during the certain time period, the control thread updates designations of the plurality of shared memory devices for which the second shared-memory based SVM is active.

18. The shared-memory-based SVM of claim 15, storing additional instructions which, when executed by the one or more processes, cause the one or more processors to perform:

based at least on the second shared-memory based SVM being nonoperational, updating a state table of the shared-memory based SVM to indicate that the shared-memory based SVM is active for each of the plurality of shared memory devices.

19. The shared-memory-based SVM of claim 16, storing additional instructions which, when executed by the one or more processes, cause the one or more processors to perform:

receiving, at the agent process of the shared-memory based SVM, from a distributed virtual filter, a count of active service virtual machines (SVMs);

determining whether the count of active SVMs is greater than one;

in response to determining that the count of active SVMs is greater than one, determining that both the shared-memory based SVM and the second shared-memory based SVM remain operational; and in response to determining that the count of active SVMs is not greater than one, determining that the shared-memory based SVM remains operational and the second shared-memory based SVM failed, and updating a state table maintained by the shared-memory based SVM to indicate that the shared-memory based SVM is active for each of the plurality of shared memory devices.

20. The shared-memory-based SVM of claim 15, storing additional instructions which, when executed by the one or more processes, cause the one or more processors to perform:

receiving, at the agent process of the shared-memory based SVM, an update for a state table maintained by the shared-memory based SVM;

wherein the update for the state table includes one or more device identifiers, corresponding to one or more of the plurality of shared memory devices for which the shared-memory based SVM is active; and based at least on the update for the state table, updating a second state table maintained by the second shared-memory based SVM to indicate the one or more of the plurality of shared memory devices for which the shared-memory based SVM is active.

* * * * *